United States Patent
Hara et al.

(10) Patent No.: US 10,066,966 B2
(45) Date of Patent: Sep. 4, 2018

(54) MAGNETIC POSITION DETECTION DEVICE AND MAGNETIC POSITION DETECTION METHOD

(71) Applicant: Mitsubishi Electric Corporation, Tokyo (JP)

(72) Inventors: Takafumi Hara, Tokyo (JP); Fusako Tomizumi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/112,454

(22) PCT Filed: Mar. 14, 2014

(86) PCT No.: PCT/JP2014/056912
§ 371 (c)(1),
(2) Date: Jul. 19, 2016

(87) PCT Pub. No.: WO2015/136690
PCT Pub. Date: Sep. 17, 2015

(65) Prior Publication Data
US 2016/0334243 A1    Nov. 17, 2016

(51) Int. Cl.
*G01D 5/165* (2006.01)
*G01D 5/245* (2006.01)

(52) U.S. Cl.
CPC .......... *G01D 5/165* (2013.01); *G01D 5/2451* (2013.01)

(58) Field of Classification Search
CPC .............. G01D 5/00–5/2525; G01B 7/30
See application file for complete search history.

(56) References Cited

U.S. PATENT DOCUMENTS

| | | | | |
|---|---|---|---|---|
| 5,461,311 A | * | 10/1995 | Nakazato | F15B 15/2861 324/207.24 |
| 7,530,177 B1 | * | 5/2009 | Meichle | G01B 3/205 33/708 |

(Continued)

FOREIGN PATENT DOCUMENTS

| | | |
|---|---|---|
| EP | 2 546 611 A1 | 1/2013 |
| JP | 07-260513 A | 10/1995 |

(Continued)

OTHER PUBLICATIONS

International Search Report for PCT/JP2014/056912 dated Jun. 3, 2014.

(Continued)

*Primary Examiner* — Huy Q Phan
*Assistant Examiner* — David Frederiksen
(74) *Attorney, Agent, or Firm* — Sughrue Mion, PLLC; Richard C. Turner

(57) ABSTRACT

A magnetic position detection device configured to detect a relative movement position of a magnetic encoder, which includes N-magnetic poles and S-magnetic poles arranged alternately in a moving direction, by a magnetosensitive portion as a change in direction of a magnetic field from the encoder. As the magnetosensitive portion, direction detection type magnetoresistive elements are arranged, which each have a resistance value that changes depending on a direction of an applied magnetic field. The encoder further includes non-magnetized portions arranged at boundaries between the N-magnetic poles and the S-magnetic poles so that changes through the movement of the encoder of a magnetic-field component Bs in the moving direction of the encoder and a magnetic-field component Br in a direction in which the magnetosensitive portion and the encoder are (Continued)

opposed to each other, which are formed at a position of the magnetosensitive portion, are approximately sinusoidal.

12 Claims, 8 Drawing Sheets

(56) References Cited

U.S. PATENT DOCUMENTS

| | | | |
|---|---|---|---|
| 2003/0076091 A1* | 4/2003 | Jiang | G01D 5/14 324/207.22 |
| 2008/0018330 A1* | 1/2008 | Legrand | G01D 5/24438 324/207.25 |
| 2008/0149881 A1* | 6/2008 | Park | C08K 3/22 252/62.54 |
| 2008/0186019 A1* | 8/2008 | Hinz | G01D 5/145 324/207.21 |
| 2009/0001970 A1* | 1/2009 | Tokunaga | G01D 5/2451 324/207.21 |
| 2009/0153134 A1 | 6/2009 | Matsumoto | |
| 2010/0156400 A1* | 6/2010 | Noguchi | G01D 5/145 324/207.25 |
| 2011/0133724 A1* | 6/2011 | Fukuoka | G01D 5/2454 324/207.2 |
| 2013/0106406 A1* | 5/2013 | Sugita | G01D 5/2451 324/207.22 |
| 2015/0243427 A1* | 8/2015 | Takahashi | H01F 13/003 335/284 |

FOREIGN PATENT DOCUMENTS

| | | | |
|---|---|---|---|
| JP | 11-6744 A | 1/1999 | |
| JP | 2009-2851 A | 1/2009 | |
| JP | 2009-014716 A | 1/2009 | |
| JP | 2009-192261 A | 8/2009 | |
| JP | 2009192261 A * | 8/2009 | |
| JP | 2010-78366 A | 4/2010 | |
| JP | 2010078366 A * | 4/2010 | |
| JP | 2011-137796 A | 7/2011 | |
| JP | WO 2011111494 A1 * | 9/2011 | G01D 5/145 |
| JP | 2011-257432 A | 12/2011 | |
| JP | 5144373 B2 | 2/2013 | |
| WO | 2007/049639 A1 | 5/2007 | |
| WO | 2011/111494 A1 | 9/2011 | |

OTHER PUBLICATIONS

Communication dated Jun. 6, 2017 issued by the Japanese Patent Office in counterpart application No. 2016-507226.

Journal of Technical Disclosure for Japanese Application No. 2006-503396, published Jun. 21, 2006 (9 pgs. total).

Communication dated Jan. 9, 2018 from the Japanese Patent Office in counterpart application No. 2016-507226.

* cited by examiner

RELATIVE MOVEMENT (ROTATION)

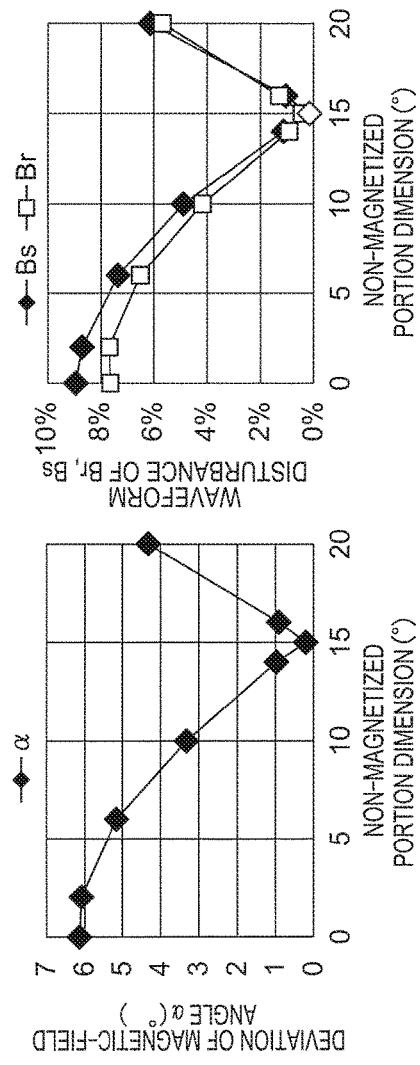
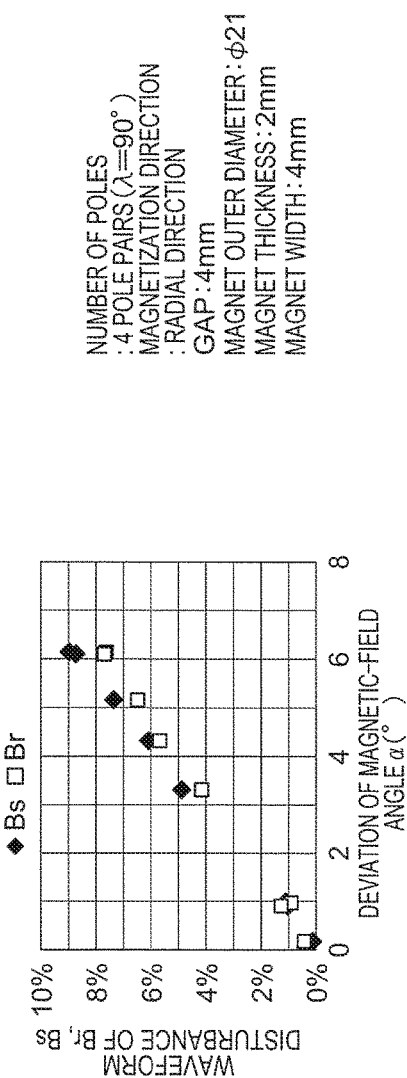
FIG. 10A
FIG. 10B
FIG. 10C

MAGNETIC POSITION DETECTION DEVICE AND MAGNETIC POSITION DETECTION METHOD

CROSS REFERENCE TO RELATED APPLICATIONS

This application is a National Stage of International Application No. PCT/JP2014/056912 filed Mar. 14, 2014, the contents of which are incorporated herein by reference in their entirety.

TECHNICAL FIELD

The present invention relates to a magnetic position detection device using magnetosensitive elements and a magnetic encoder and the like, and more particularly, to improvement of accuracy of position detection.

BACKGROUND ART

In a magnetic position detection device, a Hall element, a magnetoresistive element, or the like is used as a magnetosensitive element. In many cases, the magnetosensitive element is arranged so as to be opposed to a magnetic encoder including N-magnetic poles and S-magnetic poles that are alternately arranged at a constant pitch of $\lambda/2$ ($\lambda$: pitch of one magnetic-pole pair (N-pole and S-pole)). In this case, when the magnetic encoder and the magnetosensitive element move relative to each other, a magnetic field applied to the magnetosensitive element varies to change an output of the magnetosensitive element. The change in output of the magnetosensitive element at this time is read, thereby being capable of detecting a relative position between the magnetic encoder and the magnetosensitive element.

As an example of application of the above-mentioned detection method, detection of an electrical angle, which is required for rotation control for a brushless motor, is given. The "electrical angle" is an angular position when a rotation angle corresponding to one pair of N-pole and S-pole of the motor is 360°. In this application, the electrical angle of 360° of the motor is defined as one period. Two systems of the magnetosensitive elements, which have outputs that change in a sinusoidal fashion with respect to the electrical angle and have phases different from each other by 90°, are arranged. An arc tangent of the outputs of the two systems is computed, thereby detecting the electrical angle.

The following is known about a direction detection type magnetoresistive element having a resistance value that changes depending on a magnetic-field direction as disclosed in Patent Literature 1. Specifically, when being operated in a saturation magnetic field, the magnetoresistive element is insensitive to noise generated by fluctuation in magnetic-field intensity, and reacts only to the magnetic-field direction without increasing or decreasing the resistance value depending on the fluctuation in magnetic-field intensity due to a variation in magnetic GAP (clearance), temperature characteristics of a magnet, and the like, to thereby exhibit extremely stable detection performance. Therefore, when the direction detection type magnetoresistive element is used for motor control, the detection of the electrical angle with high stability can be realized.

CITATION LIST

Patent Literature

[PTL 1] JP 5144373 B2

SUMMARY OF INVENTION

Technical Problem

In an actual magnetic encoder, however, there is a problem in that the magnetic angle and the electrical angle do not always become equal to each other due to superimposition of a harmonic component or the like, resulting in degradation in accuracy of detection of the electrical angle.

The present invention has been made to solve the problem described above, and has an object to provide a magnetic position detection device, which is improved in accuracy of position detection and uses direction detection type magnetoresistive elements, and the like.

Solution to Problem

According to one embodiment of the present invention, there is provided a magnetic position detection device and the like, the magnetic position detection device including: a magnetic encoder including N-magnetic poles and S-magnetic poles alternately arranged in a moving direction; and a magnetosensitive portion configured to detect a change in magnetic field along with movement of the magnetic encoder so as to detect a position of the movement of the magnetic encoder, in which: the magnetosensitive portion includes direction detection type magnetoresistive elements, each having a resistance value that changes depending on a direction of an applied magnetic field; and when a magnetic-field component in the moving direction of the magnetic encoder and a magnetic-field component in a direction in which the magnetosensitive portion and the magnetic encoder are opposed to each other, which are formed at a position of the magnetosensitive portion, are Bs and Br, respectively, the magnetic encoder further includes non-magnetized portions that are unmagnetized and are arranged at boundaries between the N-magnetic poles and the S-magnetic poles so that changes in the magnetic-field component Bs and the magnetic-field component Br through the movement of the magnetic encoder are approximately sinusoidal.

Advantageous Effects of Invention

According to the present invention, it is possible to provide the magnetic position detection device, which is improved in accuracy of position detection and uses the direction detection type magnetoresistive elements, and the like.

BRIEF DESCRIPTION OF DRAWINGS

FIG. 10A is a graph for showing a result of calculation of a deviation amount of the magnetic-field angle α when a dimension of the non-magnetized portion (angle along the rotating direction) is varied, according to the present invention.

FIG. 10B is a graph for showing a result of calculation of the waveform disturbances of the magnetic-field components Br and Bs when the dimension of the non-magnetized portion (angle along the rotating direction) is varied, according to the present invention.

FIG. 10C is a graph for showing a correlation between the deviation amount of the magnetic-field angle α and the waveform disturbances of the magnetic-field components Br and Bs, according to the present invention.

DESCRIPTION OF EMBODIMENTS

Figure 7:
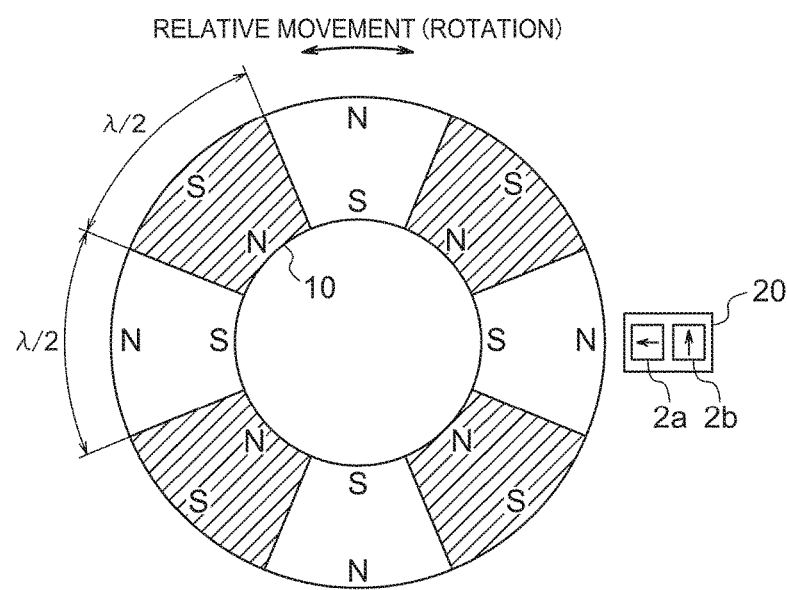
FIG. 7 is a diagram for illustrating arrangement of a magnetic encoder and a magnetosensitive portion in a related-art magnetic position detection device.

First, a magnetic position detection device is more specifically described. In the magnetic position detection device, as illustrated in FIG. 7, a magnetosensitive portion 20 including Hall elements, magnetoresistive elements, or the like is arranged so as to be opposed to a magnetic encoder 10 including N-magnetic poles and S-magnetic poles that are alternately arranged at a constant pitch of λ/2 (λ: pitch of one magnetic-pole pair (N-pole and S-pole)). When the magnetic encoder 10 and the magnetosensitive portion 20 move relative to each other, a magnetic field applied to the magnetosensitive portion 20 varies to change an output of the magnetosensitive portion 20. The change in output of the magnetosensitive portion 20 at this time is read, thereby being capable of detecting a relative position between the magnetic encoder 10 and the magnetosensitive portion 20.

A direction detection type magnetoresistive element having a resistance value that changes depending on a magnetic-field direction reacts only to a magnetic-field direction when being operated in a saturation magnetic field as described above, and therefore exhibits extremely stable detection performance. When the direction detection type magnetoresistive element is used for motor control, detection of an electrical angle with high stability can be realized.

Figure 8A:
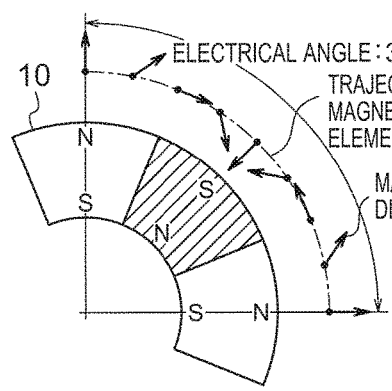
FIG. 8A is a diagram for illustrating a trajectory position of the magnetosensitive portion with respect to the magnetic encoder and the direction of the magnetic field (magnetic-field angle) α applied to the magnetosensitive portion at each trajectory position when the magnetic encoder and the magnetosensitive portion (see FIG. 8B) move relative to each other through the rotation, in the related-art magnetic position detection device.
Figure 8B:
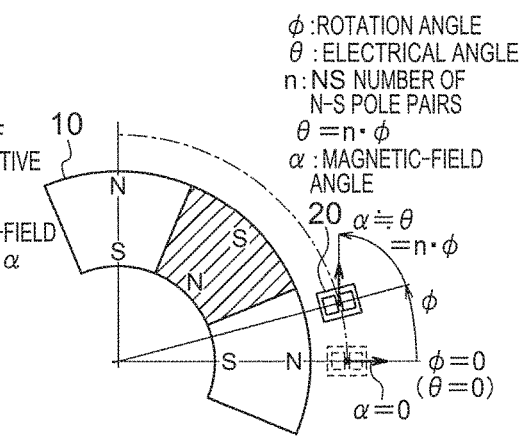
FIG. 8B is a diagram for illustrating a relationship between the rotation angle φ, the electrical angle θ, and the magnetic-field angle α, in the related-art magnetic position detection device.

In this case, as illustrated in FIG. 8A and FIG. 8B, it is only necessary that one pitch of arrangement of the pair of N-pole and S-pole and a rotation angle φ corresponding to the electrical angle of 360° match with each other, and the number n of magnetic-pole pairs of the magnetic encoder 10 be set so that a magnetic-field angle α formed by the magnetic encoder 10 and the electrical angle θ become approximately equal to each other. FIG. 8A and FIG. 8B are illustrations of an example where the rotation angle (φ) of 90° of the magnetic encoder 10, the motor electrical angle (θ) of 360°, and one pitch of the N-S pair of the magnetic encoder 10 match with each other, specifically, n=4. FIG. 8A is an illustration of a trajectory position of the magnetosensitive portion 20 with respect to the magnetic encoder 10 and the direction of the magnetic field (magnetic-field angle) α applied to the magnetosensitive portion 20 at each trajectory position when the magnetic encoder 10 and the magnetosensitive portion 20 (see FIG. 8B) move relative to each other through the rotation. In FIG. 8B, a relationship between the rotation angle φ, the electrical angle θ, and the magnetic-field angle α is illustrated. As illustrated in FIG. 8A and FIG. 8B, the magnetic field applied to the magnetosensitive portion 20 rotates 360° over the electrical angle of 360°. Therefore, the electrical angle θ and the magnetic-field angle α are approximately equal to each other.

In an actual magnetic encoder, however, the magnetic-field angle α and the electrical angle θ do not always become equal to each other due to superimposition of a harmonic component or the like. As a result, accuracy of detection of the electrical angle θ is degraded.

Figure 9A:
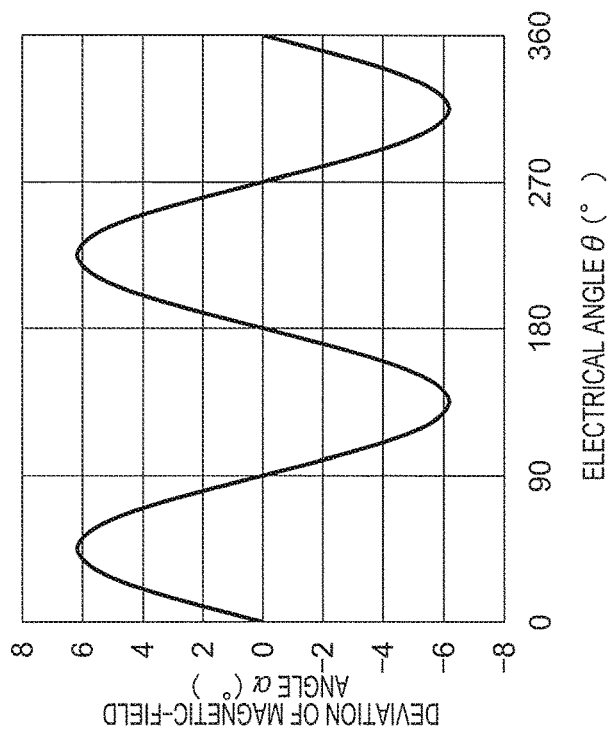
FIG. 9A is a graph for showing the magnetic-field angle α at a position of the arbitrary electrical angle θ, in the related-art magnetic position detection device.
Figure 9B:
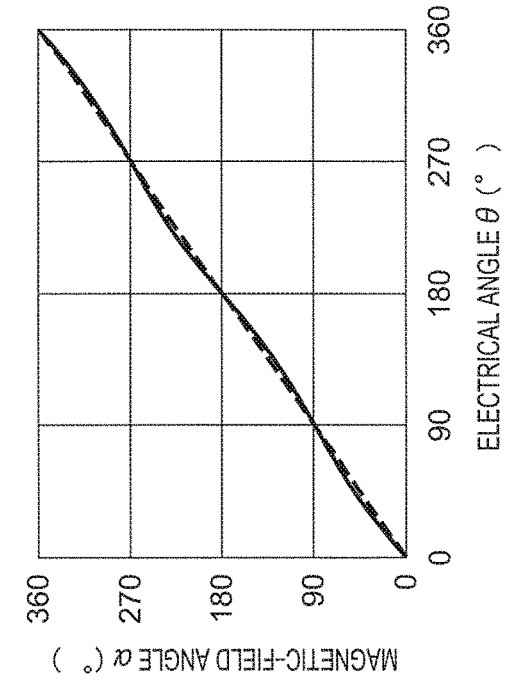
FIG. 9B is a graph for showing a differential value between the magnetic-field angle α and the electrical angle θ as a deviation of the magnetic-field angle α, in the related-art magnetic position detection device.

FIG. 9A and FIG. 9B are graphs for showing results of calculation of a value of the magnetic-field direction (magnetic—field angle) α in the related-art magnetic encoder (for example, in a case of the number of poles: four pole pairs, magnetization direction: radial direction, GAP (clearance): 4 mm, magnet outer diameter: φ21, magnet thickness: 2 mm, and magnet width: 4 mm) by a finite element method. FIG. 9A is a graph for showing the magnetic-field angle α at a position of the arbitrary electrical angle θ. The solid line indicates the magnetic-field angle α of the related-art magnetic encoder, whereas the broken line indicates the magnetic-field angle α in a case of magnetic-field angle α=electrical angle θ. FIG. 9B is a graph for showing a differential value between the magnetic-field angle α and the electrical angle θ as a deviation of the magnetic-field angle α.

As described above, the magnetic-field angle α of the magnetic field and the electrical angle θ are not equal to each other in the related art. As a result, the degradation in accuracy of the detection of the angle is brought about thereby. In particular, when a magnetic-pole pitch length is large, specifically, when the motor has a large diameter and a small number of poles, the deviation of the magnetic-field angle α is large. Therefore, in order to avoid the degradation in accuracy of the angle detection, countermeasures are required, such as increasing the magnetic GAP (clearance), increasing a size of the device, and increasing a size of a magnet so that the magnetosensitive portion can react even with the large magnetic GAP, and hence the related-art magnetic position detection device is not practical.

In the present invention, the accuracy of detection of the motor electrical angle is improved inexpensively without increasing the device and the magnet in size.

Next, the outline and theory of a magnetic position detection device according to the present invention are described.

The magnetic position detection device configured to detect, for example, a rotation angle (rotational position) according to the present invention includes a magnetic encoder including N-magnetic poles and S-magnetic poles arranged alternately in a rotating direction and a magnetosensitive portion that is arranged so as to be opposed to the magnetic encoder with a predetermined clearance therebetween. A change in magnetic field caused along with the rotation of the magnetic encoder is detected by the magnetosensitive portion. The magnetosensitive portion includes direction detection type magnetoresistive elements, each having a resistance value that changes depending on the magnetic-field direction. Further, when a magnetic-field component in a radial (opposing) direction and a magnetic-field component in a rotating (moving) direction, which are formed by the magnetic encoder at a position of the magnetosensitive portion, are Br and Bs, respectively, non-magnetized portions that are not substantially magnetized are provided at boundaries between the N-magnetic poles and the S-magnetic poles so that Br and Bs are approximately sinusoidal or sinusoidal.

A cause of the deviation of the magnetic-field angle α shown in FIG. 9B is deviations of the magnetic-field components Br and Bs respectively from ideal waveforms $Br=A \cdot COS(n*\phi)$ and $Bs=B \cdot SIN(n*\phi)$, where n: the number of magnetic-pole pairs of the magnetic encoder, φ: the rotation angle of the magnetic encoder, and A, B: constants (magnetic-field amplitudes).

Although waveform disturbances of the magnetic-field components Br and Bs can be reduced by increasing the magnetic GAP, the waveform disturbances of the magnetic-field components Br and Bs can be reduced without increasing the magnetic GAP by providing the non-magnetized portions that are not magnetized in the boundary portions between the N-poles and the S-poles. Further, by setting a dimension of each of the non-magnetized portions to an optimal value, the waveform disturbances of the magnetic-field components Br and Bs and the magnetic-field angle α can be optimized.

FIG. 10A is a graph for showing a result of calculation of a deviation amount of the magnetic-field angle α when a dimension of the non-magnetized portion (angle along the rotating direction) is varied, FIG. 10B is a graph for showing a result of calculation of the waveform disturbances of the magnetic-field components Br and Bs when the dimension of the non-magnetized portion (angle along the rotating direction) is varied, and FIG. 10C is a graph for showing a correlation between the deviation amount of the magnetic-field angle α and the waveform disturbances of the magnetic-field components Br and Bs. The other conditions are: the number of poles: four pole pairs (λ=90°), magnetization direction: radial direction, GAP (clearance): 4 mm, magnet outer diameter: φ21, magnet thickness: 2 mm, and magnet width: 4 mm.

From FIGS. 10A-10C, it is understood that the deviation of the magnetic-field angle α can be reduced by suppressing the waveform disturbances of the magnetic-field components Br and Bs (see, in particular, FIG. 10C). Further, when the dimension of each of the non-magnetized portions is set to 15°, specifically, when the dimension of the non-magnetized portion is set to ⅙ (=λ/6) of the magnetic-pole pair pitch for the magnetic-pole pair pitch λ=90°, the deviation of the magnetic-filed angle α is most reduced (see, in particular, FIG. 10A). Even when the number of magnetic poles and the magnet outer diameter are changed, the best result is obtained by setting the dimension of the non-magnetized portion to ⅙ of the magnetic-pole pair pitch.

Figure 11A:
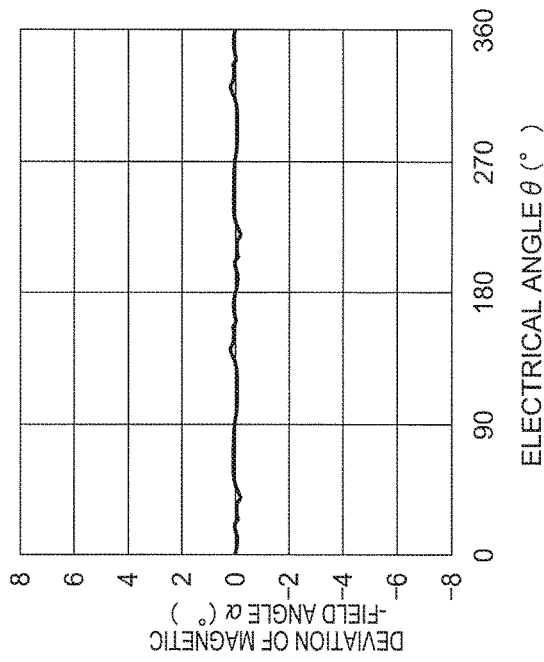
FIG. 11A is a graph for showing a result of calculation of the magnetic-field direction (magnetic-field angle) α with respect to the electrical angle θ when the non-magnetized portions are provided at ⅙ (=15°) of the magnetic-pole pair pitch λ, according to the present invention.
Figure 11B:
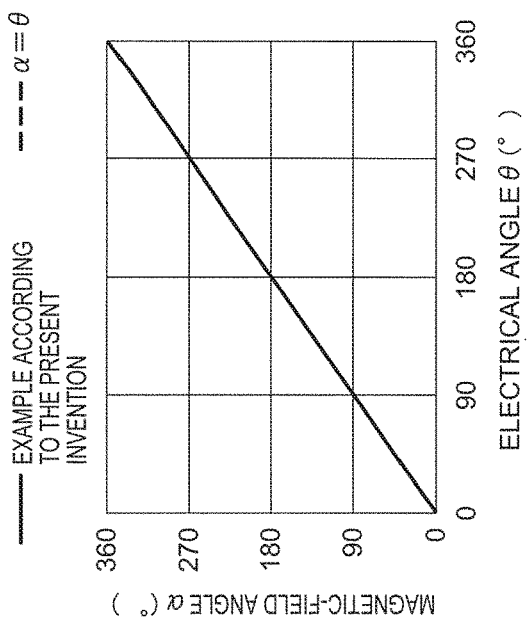
FIG. 11B is a graph for showing a result of calculation of the deviation of the magnetic-field direction (magnetic-field angle) α with respect to the electrical angle θ, according to the present invention.

FIG. 11A is a graph for showing a result of calculation of the magnetic-field direction (magnetic-field angle) α with respect to the electrical angle θ when the non-magnetized portions are provided at ⅙ (=15°) of the magnetic-pole pair pitch λ as in the present invention, as described below. The solid line indicating the magnetic-field angle α of the magnetic encoder of the present invention overlaps the broken line indicating the magnetic-field angle α in a case of magnetic-field angle α=electrical angle θ to hide the broken line. FIG. 11B is a graph for showing a result of calculation of the deviation of the magnetic-field direction (magnetic-field angle) α with respect to the electrical angle θ in the above-mentioned case. The other conditions are the same as those of the case of FIG. 9A and FIG. 9B, specifically, the number of poles: four pole pairs (λ=90), magnetization direction: radial direction, GAP (clearance): 4 mm, magnet outer diameter: φ21, magnet thickness: 2 mm, and magnet width: 4 mm. With the non-magnetized portions formed to have a length of λ/6 in a moving direction, in comparison to the related art illustrated in FIG. 9A and FIG. 9B without the non-magnetized portions, the deviation of the magnetic-field angle α is significantly reduced, and hence the electrical angle θ and the magnetic-field angle α are approximately equal to each other.

As described above, by providing the non-magnetized portions at the boundaries between the N-poles and the S-poles, the magnetic-field components Br and Bs become approximately sinusoidal or sinusoidal so that the magnetic angle $\alpha=Tan^{-1}$ (Bs/Br) becomes stably equal to the electrical angle θ (=·n) to be detected. Thus, the electrical angle θ (=φ·n) can be detected with high accuracy. In particular, by setting the dimension of each of the non-magnetized portions to a value close to ⅙ of the magnetic-pole pair pitch λ, greater effects are obtained.

For the use for control of the brushless motor, about 1° in electrical angle is generally required as the accuracy of detection of the rotation angle. In order to realize the above-mentioned accuracy, the deviation of the magnetic-field angle α is required to be suppressed to 1° or smaller. From FIG. 10C, it is understood that the deviation amounts (waveform disturbances) of the magnetic-field components Br and Bs from the respective ideal waveforms $Br=A \cdot COS$ $(n*\phi)$ and $Bs=B \cdot SIN(n*\phi)$ only need to be suppressed to 1% (−40 dB) or smaller.

As described above, the accuracy of detection of the motor electrical angle can be improved without increasing the device and the magnet in size by the application of the present invention. Thus, the practical magnetic rotation position detection device for the motor can be realized inexpensively.

Referring to the accompanying drawings, a magnetic position detection device and the like according to each embodiment of the present invention, which are based on the above-mentioned theory, are described below. Note that, in each embodiment, the same or corresponding elements are denoted by the same reference symbols and a redundant description is omitted.

First Embodiment

Figure 1:
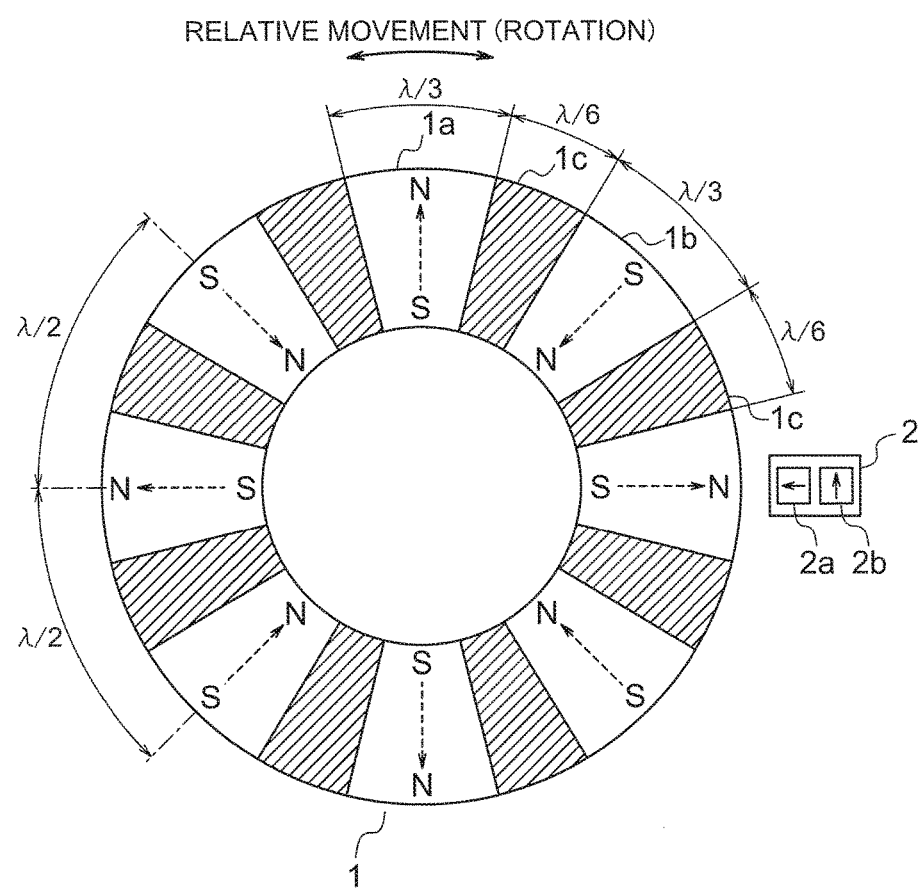
FIG. 1 is a configuration diagram of a main part of a magnetic position detection device according to a first embodiment of the present invention.

FIG. 1 is a configuration diagram of a main part of a magnetic position detection device according to a first embodiment of the present invention, for illustrating an example of arrangement of a magnetic encoder and a magnetosensitive portion. A magnetic encoder 1 configured to detect a rotation angle has a hollow columnar shape as a whole, and includes n sets (n=4 in this case), each including an N-magnetic pole 1a magnetized to an N-pole, a non-magnetized portion 1c that is not magnetized, an S-magnetic pole 1b magnetized to an S-pole, and the non-magnetized portion 1c that is not magnetized, which are arranged in the stated order. The n sets are repeatedly arranged at a pitch $\lambda$ in a rotating direction. The N-magnetic poles 1a, the S-magnetic poles 1b, and the non-magnetized portions 1c may be made of the same magnetic material, or the non-magnetized portions 1c may be made of a different material, namely, a non-magnetic material. In this embodiment, the magnetization is carried out so that lines of magnetic force inside the magnetic encoder 1 are oriented from an outer peripheral portion to an inner peripheral portion or from the inner peripheral portion to the outer peripheral portion.

Further, as a configuration capable of detecting the rotation angle with the highest accuracy, a width (length) along the rotating direction (moving direction) is set to $\lambda/3$ for each of the N-magnetic poles 1a and the S-magnetic poles 1b and to $\lambda/6$ for each of the non-magnetized portions 1c. Although the width of the non-magnetized portion 1c is not necessarily required to be $\lambda/6$, the width is desired to be closer to $\lambda/6$ (approximately $\lambda/6$). In the present invention, $\lambda$ is the pitch of one magnetic-pole pair including the pair of N-magnetic pole 1a and the S-magnetic pole 1b, the non-magnetized portion 1c between the N-magnetic pole 1a and the S-magnetic pole 1b, and the non-magnetized portion 1c provided on a side opposite to the non-magnetic portion 1c of the N-magnetic pole 1a or the S-magnetic pole 1b as described above.

On the other hand, the magnetosensitive portion 2 is arranged so as to be opposed to the magnetic encoder 1 with a clearance therebetween. The magnetic encoder 1 and the magnetosensitive portion 2 can move (rotate) relative to each other, and are configured such that the clearance is approximately constant even when the relative movement occurs.

A magnetic field is applied to the magnetosensitive portion 2 by the magnetic encoder 1. When the relative movement (rotation) occurs between the magnetic encoder 1 and the magnetosensitive portion 2, a direction of the magnetic field applied to the magnetosensitive portion 2 changes. The magnetosensitive portion 2 includes direction detection type magnetoresistive elements 2a and 2b, each having a resistance value that changes depending on the direction of the applied magnetic field, and has a resistance value that changes depending on change of the above-mentioned magnetic-field direction. As the direction detection type magnetoresistive elements, tunnel magnetoresistive elements, spin-valve type GMR elements, and the like are suitable. Through the rotation of the magnetic encoder 1, an approximately sinusoidal change in resistance value occurs in each of the magnetoresistive elements 2a and 2b. The magnetoresistive elements 2a and 2b are arranged so that phases of the approximately sinusoidal changes in resistance value are shifted by 90° with respect to each other. In FIG. 1, the changes in resistance having the phases shifted by 90° are realized by arranging the magnetoresistive elements 2a and 2b so as to be inclined by 90° with respect to each other. However, the magnetoresistive elements may also be arranged to be oriented in the same direction so as to be separated from each other by $\lambda/4$ in the rotating direction. Further, each of the magnetoresistive elements 2a and 2b may include a plurality of magnetoresistive elements.

Here, the direction detection type magnetoresistive elements (2a, 2b) respectively exhibit the resistance values in accordance with the magnetic-field direction, which are determined by a ratio of the magnetic-field components Br and Bs at a position of arrangement. The elements have orientations, and the changes in resistance with respect to the combination of the orientation of the element and the orientation of the magnetic field are, for example, as follows.

Magnetic field having the same orientation as that of the arrow: bottom resistance value Magnetic field having orientation opposite to that of the arrow: peak resistance value Magnetic field oriented at 90° with respect to the arrow: median resistance value Therefore, when the two elements are arranged at the same position so as to be inclined by 90° with respect to each other, the changes in resistance, which have the phases shifted from each other by 90°, are obtained.

Figure 2:
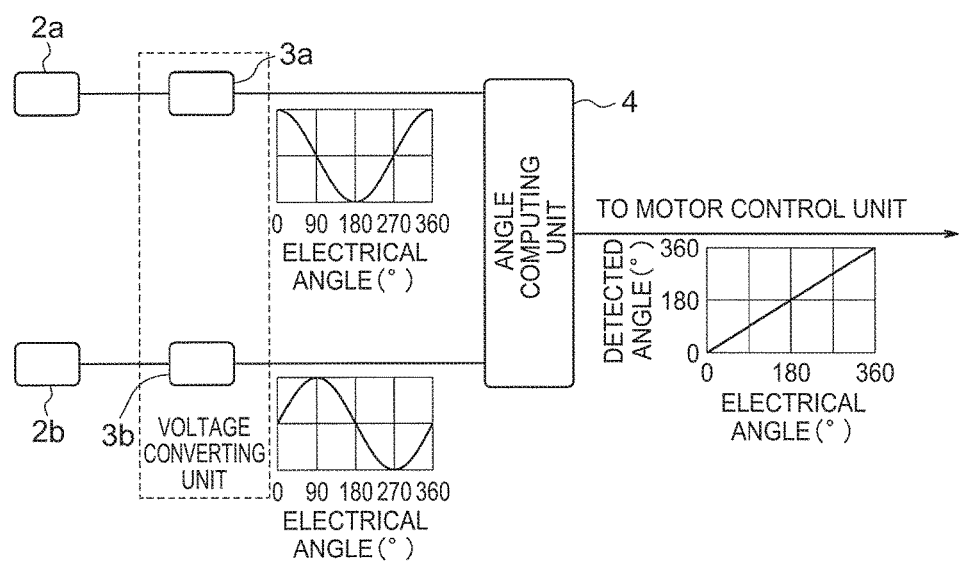
FIG. 2 is an illustration of a configuration of a signal processing unit of the magnetic position detection device according to the first embodiment of the present invention.

FIG. 2 is an illustration of a configuration of a signal processing unit of the magnetic position detection device according to the first embodiment of the present invention. The changes in resistance value of the magnetoresistive elements 2a and 2b are output after being converted into voltage changes V cos and V sin respectively by voltage converting units 3a and 3b. Thereafter, the voltage changes V cos and V sin are input to an angle computing unit 4 inside or outside of the device so as to be converted into an electrical angle or a rotation angle through arc tangent of the voltage changes V cos and V sin. The electrical angle or the rotation angle is then fed to, for example, a motor control unit (not shown) or the like so as to be used for motor rotation control.

For the motor control, the electrical angle or the rotation angle within the pitch of the magnetic encoder configured to rotate together with a rotor is required. Therefore, a pitch in which the electrical angle or the rotation angle is present is not necessarily required to be detected.

Second Embodiment

Figure 3:
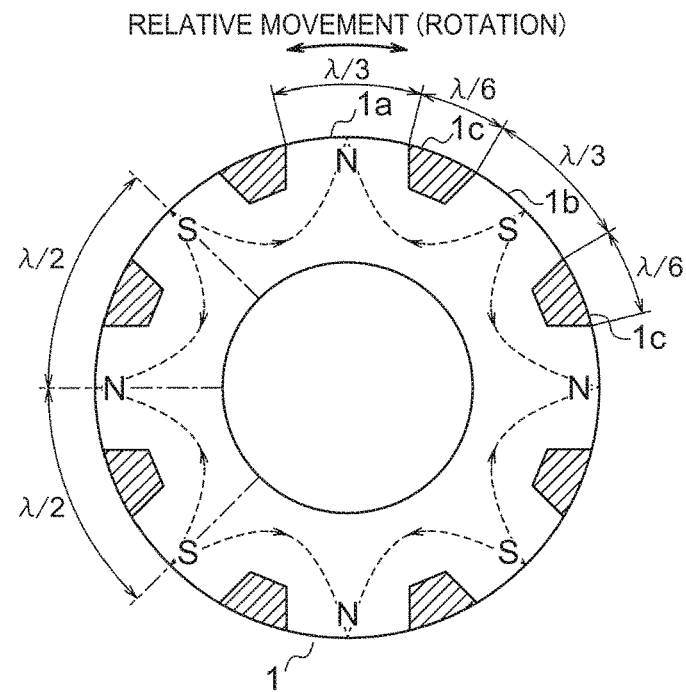
FIG. 3 is a configuration diagram of a magnetic encoder of a magnetic position detection device according to a second embodiment of the present invention.

FIG. 3 is a configuration diagram of a magnetic encoder of a magnetic position detection device according to a second embodiment of the present invention. The magnetic encoder 1 configured to detect the rotation angle has a hollow columnar shape as a whole, and includes n sets (n=4 in this case), each including the N-magnetic pole 1a magnetized to the N-pole, the non-magnetized portion 1c that is not magnetized, the S-magnetic pole 1b magnetized to the S-pole, and the non-magnetized portion 1c that is not magnetized, which are arranged in the stated order. The n sets are repeatedly arranged at the pitch $\lambda$ in the rotating direction.

In this embodiment, the non-magnetized portions 1c are formed only in the vicinity of an outer peripheral surface, and the magnetization is carried out so that the lines of magnetic force inside the magnetic encoder 1 are oriented to the outer peripheral surface of the adjacent magnetic poles. Similarly to the first embodiment, the N-magnetic poles 1a, the S-magnetic poles 1b, and the non-magnetized portions 1c may be made of the same magnetic material, or the non-magnetized portions 1c may be made of a different material, namely, a non-magnetic material. The widths of each of the N-magnetic poles 1a, each of the S-magnetic poles 1b, and each of the non-magnetized portions 1c along the rotating direction (moving direction) are the same as those in the first embodiment, and are therefore set to λ/3, λ/3, and λ/6, respectively. Although not illustrated, the configurations of the magnetosensitive portion and the signal processing unit are the same as those of the first embodiment.

Third Embodiment

Figure 4:
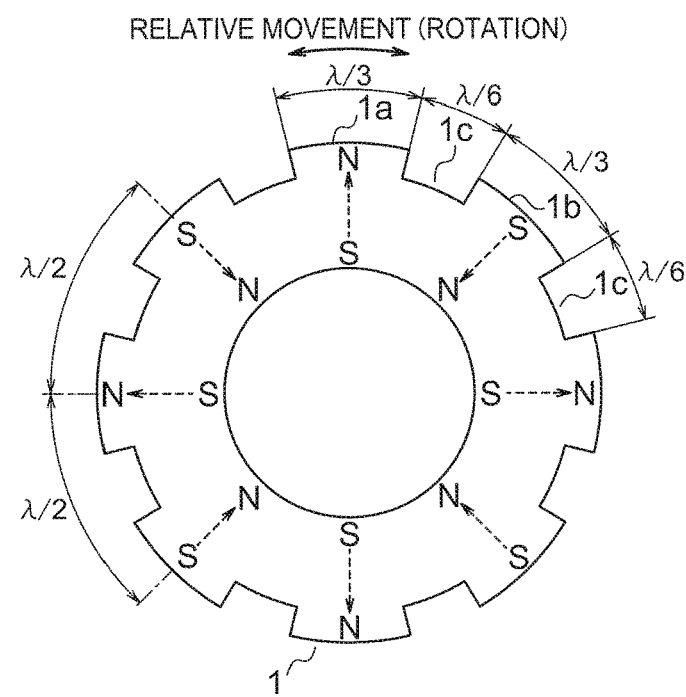
FIG. 4 is a configuration diagram of a magnetic encoder of a magnetic position detection device according to a third embodiment of the present invention.

FIG. 4 is a configuration diagram of a magnetic encoder of a magnetic position detection device according to a third embodiment of the present invention. The magnetic encoder 1 configured to detect the rotation angle has a hollow columnar shape as a whole, and includes n sets (n=4 in this case), each including the N-magnetic pole 1a magnetized to the N-pole, the non-magnetized portion 1c, the S-magnetic pole 1b magnetized to the S-pole, and the non-magnetized portion 1c, which are arranged in the stated order. The n sets are repeatedly arranged at the pitch λ in the rotating direction.

In this embodiment, each of the non-magnetized portions 1c is formed to have a cutaway shape. In this manner, intensity of the magnetic field in outer peripheral portions of the non-magnetized portions 1c is reduced, thereby forming substantial non-magnetized portions. Further, the magnetization is carried out so that the lines of magnetic force inside the magnetic encoder 1 are oriented from the outer peripheral portion to the inner peripheral portion or from the inner peripheral portion to the outer peripheral portion.

The widths of each of the N-magnetic poles 1a, each of the S-magnetic poles 1b, and each of the non-magnetized portions 1c along the rotating direction (moving direction) are the same as those in the first embodiment, and are therefore set to λ/3, λ/3, and λ/6, respectively. Although not illustrated, the configurations of the magnetosensitive portion and the signal processing unit are the same as those of the first embodiment.

Fourth Embodiment

Figure 5:
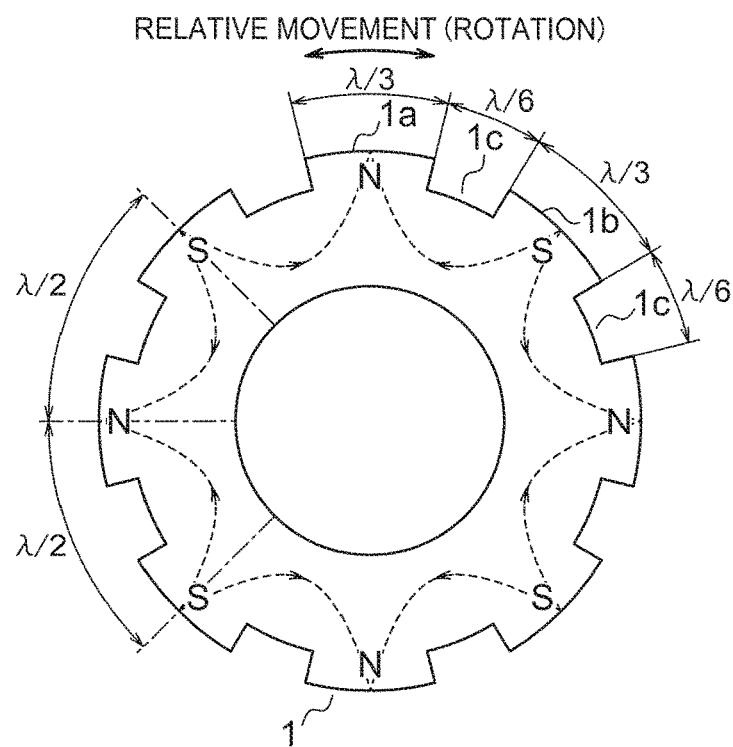
FIG. 5 is a configuration diagram of a magnetic encoder of a magnetic position detection device according to a fourth embodiment of the present invention.

FIG. 5 is a configuration diagram of a magnetic encoder of a magnetic position detection device according to a fourth embodiment of the present invention. The magnetic encoder 1 configured to detect the rotation angle has a hollow columnar shape as a whole, and includes n sets (n=4 in this case), each including the N-magnetic pole 1a magnetized to the N-pole, the non-magnetized portion 1c, the S-magnetic pole 1b magnetized to the S-pole, and the non-magnetized portion 1c, which are arranged in the stated order. The n sets are repeatedly arranged at the pitch λ in the rotating direction.

In this embodiment, each of the non-magnetized portions 1c is formed to have a cutaway shape. In this manner, intensity of the magnetic field in outer peripheral portions of the non-magnetized portions 1c is reduced, thereby forming substantial non-magnetized portions. Further, the magnetization is carried out so that the lines of magnetic force inside the magnetic encoder 1 are oriented to the outer peripheral surface of the adjacent magnetic poles.

The widths of each of the N-magnetic poles 1a, each of the S-magnetic poles 1b, and each of the non-magnetized portions 1c along the rotating direction (moving direction) are the same as those in the first embodiment, and are therefore set to λ/3, λ/3, and λ/6, respectively. Although not illustrated, the configurations of the magnetosensitive portion and the signal processing unit are the same as those of the first embodiment.

The application of the present invention is not limited to the detection of the electrical angle of the motor. The present invention may be applied to detection of a rotational position or detection of a linear position of other apparatus.

Further, although the magnetic encoder having the hollow columnar shape is described in each of the embodiments described above, the magnetic encoder is not necessarily required to be hollow and may have a columnar shape.

Fifth Embodiment

Figure 6:
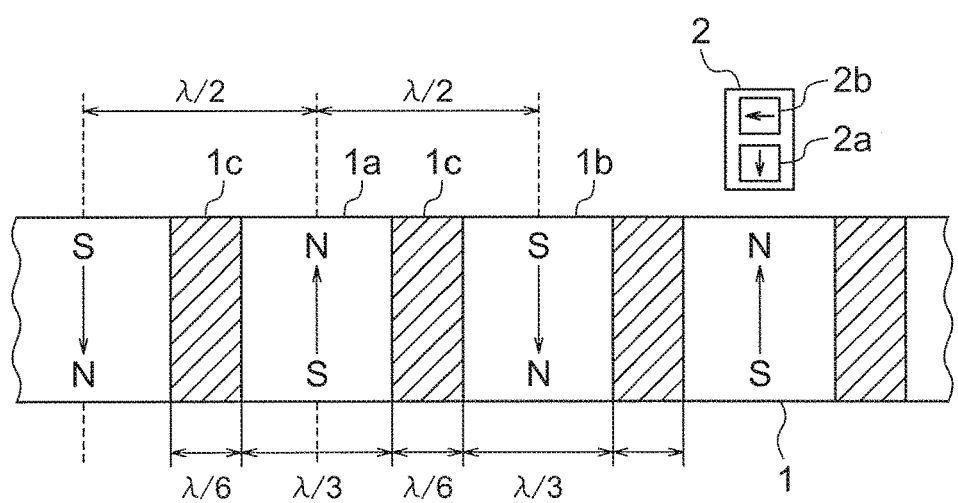
FIG. 6 is a configuration diagram of a main part of a magnetic position detection device according to a fifth embodiment of the present invention.

FIG. 6 is a partial configuration diagram of a magnetic position detection device according to a fifth embodiment of the present invention, for illustrating an example of arrangement of a magnetic encoder and a magnetosensitive portion. The magnetic encoder 1 configured to detect a position of linear movement has a linear shape as a whole, and includes sets each including the N-magnetic pole 1a magnetized to the N-pole, the non-magnetized portion 1c, the S-magnetic pole 1b magnetized to the S-pole, and the non-magnetized portion 1c, which are arranged in the stated order. The sets are repeatedly arranged.

Further, as a configuration capable of detecting the rotation angle with the highest accuracy, the width (length) along the moving direction is set to λ/3 for the N-magnetic poles 1a and the S-magnetic poles 1b and λ/6 for the non-magnetized portions 1c. Although the width of each of the non-magnetized portions 1c is not necessarily required to be λ/6, it is desired to set the width closer to λ/6 (approximately λ/6).

On the other hand, the magnetosensitive portion 2 is arranged so as to be opposed to the magnetic encoder 1 with a clearance therebetween. The magnetic encoder 1 and the magnetosensitive portion 2 can move relative to each other, and are configured such that the clearance is approximately constant even when the relative movement occurs.

A magnetic field is applied to the magnetosensitive portion 2 by the magnetic encoder 1. When the relative movement occurs between the magnetic encoder 1 and the magnetosensitive portion 2, a direction of the magnetic field applied to the magnetosensitive portion 2 changes. The magnetosensitive portion 2 includes the direction detection type magnetoresistive elements 2a and 2b, each having a resistance value that changes depending on the direction of the applied magnetic field, and has a resistance value that changes depending on change of the above-mentioned magnetic-field direction. As the direction detection type magnetoresistive elements, tunnel magnetoresistive elements, spin-valve type GMR elements, and the like are suitable. Through the linear movement of the magnetic encoder 1 or the magnetosensitive portion 2, an approximately sinusoidal change in resistance value occurs in each of the magnetoresistive elements 2a and 2b. The magnetoresistive elements 2a and 2b are arranged so that phases of the approximately sinusoidal changes in resistance value are shifted by 90° with respect to each other. In FIG. 6, the changes in resistance having the phases shifted by 90° are realized by arranging the magnetoresistive elements 2a and 2b so as to be inclined by 90° with respect to each other. However, the magnetoresistive elements may also be arranged to be oriented in the same direction so as to be separated from each other by λ/4 in the moving direction. Further, each of the magnetoresistive elements 2a and 2b may include a plurality of magnetoresistive elements.

In each of the embodiments relating to the position detection of rotational movement, each of the non-magnetized portions 1c of the magnetic encoder 1 is set to have such a dimension that both the deviation amounts are −40 dB (1%) or smaller of the magnetic-field amplitude A or B with respect to the ideal magnetic-field changes expressed by Br=A·COS(n*φ) and Bs=B·SIN(n*φ) when the number of poles of the magnetic encoder is n pole pairs, φ is the rotation angle, and A and B are the constants (magnetic-field amplitudes).

Further, for formation of the magnetic encoder 1, the formations described in each of the embodiments described above is applicable.

Further, as a configuration of the signal processing unit, the angle computing unit 4 serves as a position computing unit configured to compute a relative position between the magnetic encoder 1 and the magnetosensitive portion 2 in the configuration illustrated in FIG. 2.

Further, although the case where the magnetic encoder 1 moves relative to the magnetosensitive portion 2 is described in each of the embodiments, the present invention is also applicable even to a case where the magnetosensitive portion 2 moves relative to the magnetic encoder 1.

The present invention is not limited to each of the embodiments described above, but encompasses all the possible combinations thereof.

INDUSTRIAL APPLICABILITY

The magnetic position detection device according to the present invention is applicable to position detection in many fields.

REFERENCE SIGNS LIST 1 magnetic encoder, 1a N-magnetic pole, 1b S-magnetic pole, 1c non-magnetized portion, 2 magnetosensitive portion, 2a, 2b direction detection type magnetoresistive element, 3a, 3b voltage converting unit, 4 angle (position) computing unit

The invention claimed is:

1. A magnetic position detection device, comprising:
   a magnetic encoder comprising N-magnetic poles and S-magnetic poles alternately arranged in a moving direction; and
   a magnetosensitive portion configured to detect a change in a magnetic field along with movement of the magnetic encoder so as to detect a position of the movement of the magnetic encoder, wherein:
   the magnetosensitive portion comprises direction detection type magnetoresistive elements, each of the direction detection type magnetosensitive elements having a resistance value that changes in accordance with on a direction of the magnetic field;
   when a magnetic-field component in the moving direction of the magnetic encoder and a magnetic-field component in a direction in which the magnetosensitive portion and the magnetic encoder are opposed to each other, which are formed at a position of the magnetosensitive portion, are Bs and Br, respectively, the magnetic encoder further comprises non-magnetized portions that are unmagnetized and are arranged at boundaries between the N-magnetic poles and the S-magnetic poles so that changes in the magnetic-field component Bs and the magnetic-field component Br through the movement of the magnetic encoder are approximately sinusoidal; and
   a length of each of the non-magnetized portions in the moving direction is shorter than a length of each of the N-magnetic poles and the S-magnetic poles in the moving direction,
   wherein, when a pitch of a magnetic-pole pair including a pair of the N-magnetic pole and the S-magnetic pole, the non-magnetized portion between the N-magnetic pole and the S-magnetic pole, and the non-magnetized portion present on a side of the N-magnetic pole or the S-magnetic pole, which is opposite to the non-magnetized portion, is λ, the length of each of the non-magnetized portions in the moving direction is approximately λ/6.

2. The magnetic position detection device according to claim 1, wherein:
   the magnetic position detection device is configured to detect a rotation angle of the magnetic encoder;
   the magnetic encoder has a columnar shape including the N-magnetic poles, the S-magnetic poles, and the non-magnetic poles arranged in a rotating direction of the magnetic encoder;
   the magnetosensitive portion comprises the direction detection type magnetoresistive elements configured to detect the direction of the magnetic field formed by the magnetic encoder at the position of the magnetosensitive portion; and
   when a number of poles of the magnetic encoder is n pole pairs, φ is a rotation angle, and A and B are magnetic-field amplitudes, each of the non-magnetized portions of the magnetic encoder has a dimension so that deviation amounts of Br and Bs from magnetic-field changes respectively expressed as Br=A·COS(n*φ) and Bs=B·SIN(n*φ) are −40 dB or smaller of the magnetic-field amplitude A or the magnetic-field amplitude B.

3. The magnetic position detection device according to claim 2, wherein the N-magnetic poles, the S-magnetic poles, and the non-magnetized portions comprise a same magnetic material, the N-magnetic poles being magnetized to an N-pole, the S-magnetic poles being magnetized to an S-pole, the non-magnetized portions being unmagnetized.

4. The magnetic position detection device according to claim 1, wherein the N-magnetic poles, the S-magnetic poles, and the non-magnetized portions comprise a same magnetic material, the N-magnetic poles being magnetized to an N-pole, the S-magnetic poles being magnetized to an S-pole, the non-magnetized portions being unmagnetized.

5. The magnetic position detection device according to claim 1, wherein the N-magnetic poles and the S-magnetic poles comprise a magnetic material, and the non-magnetized portions comprises a non-magnetic material.

6. The magnetic position detection device according to claim 1, wherein the N-magnetic poles, the S-magnetic poles, and the non-magnetized portions comprise a same magnetic material, and
   wherein each of the N-magnetic poles is spaced apart from each of the S-magnetic poles, and a length of each of the non-magnetized portions in a radial direction of the magnetic encoder is shorter than a length of each of the N-magnetic poles and the S-magnetic poles in the radial direction.

7. The magnetic position detection device according to claim 1, wherein the direction detection type magnetoresistive elements comprise tunnel magnetoresistive elements.

8. The magnetic position detection device according to claim 1, wherein the direction detection type magnetoresistive elements comprise spin-valve type giant magnetoresistance (GMR) elements.

9. The magnetic position detection device according to claim 1, wherein the magnetosensitive portion is configured to move in place of the magnetic encoder.

10. A magnetic position detection device, comprising:
a magnetic encoder comprising N-magnetic poles and S-magnetic poles alternately arranged in a moving direction; and
a magnetosensitive portion configured to detect a change in a magnetic field along with movement of the magnetic encoder so as to detect a position of the movement of the magnetic encoder, wherein:
the magnetosensitive portion comprises direction detection type magnetoresistive elements, each of the direction detection type magnetosensitive elements having a resistance value that changes in accordance with on a direction of the magnetic field;
when a magnetic-field component in the moving direction of the magnetic encoder and a magnetic-field component in a direction in which the magnetosensitive portion and the magnetic encoder are opposed to each other, which are formed at a position of the magnetosensitive portion, are Bs and Br, respectively, the magnetic encoder further comprises non-magnetized portions that are unmagnetized and are arranged at boundaries between the N-magnetic poles and the S-magnetic poles so that changes in the magnetic-field component Bs and the magnetic-field component Br through the movement of the magnetic encoder are approximately sinusoidal; and
when a pitch of a magnetic-pole pair including a pair of the N-magnetic pole and the S-magnetic pole, the non-magnetized portion between the N-magnetic pole and the S-magnetic pole, and the non-magnetized portion present on a side of the N-magnetic pole or the S-magnetic pole, which is opposite to the non-magnetized portion, is $\lambda$, a length of each of the non-magnetized portions in the moving direction is approximately $\lambda/6$.

11. The magnetic position detection device according to claim 10, wherein the N-magnetic poles, the S-magnetic poles, and the non-magnetized portions comprise a same magnetic material, the N-magnetic poles being magnetized to an N-pole, the S-magnetic poles being magnetized to an S-pole, the non-magnetized portions being unmagnetized.

12. A magnetic position detection method for detecting a relative movement position of a magnetic encoder, which includes N-magnetic poles and S-magnetic poles arranged alternately in a moving direction, by a magnetosensitive portion as a change in a magnetic field from the magnetic encoder, the magnetic position detection method comprising:
arranging, as the magnetosensitive portion, direction detection type magnetoresistive elements, each of the direction detection type magnetosensitive elements having a resistance value that changes in accordance with on a direction of the magnetic field; and
arranging, when a magnetic-field component in the moving direction of the magnetic encoder and a magnetic-field component in a direction in which the magnetosensitive portion and the magnetic encoder are opposed to each other, which are formed at a position of the magnetosensitive portion, are Bs are Br, respectively, non-magnetized portions that are unmagnetized in the magnetic encoder at boundaries between the N-magnetic poles and the S-magnetic poles so that changes in the magnetic-field component Bs and the magnetic-field component Br through the movement of the magnetic encoder are approximately sinusoidal,
wherein a length of each of the non-magnetized portions in the moving direction is approximately $\lambda/6$, and $\lambda$ is a pitch between two adjacent N-magnetic poles among the N-magnetic poles.

* * * * *